United States Patent [19]

Witt

[11] 3,770,902

[45] Nov. 6, 1973

[54] INTERLOCK SYSTEM FOR TAPE TRANSPORT

[75] Inventor: William F. Witt, Palo Alto, Calif.

[73] Assignee: Avco Corporation

[22] Filed: Nov. 12, 1971

[21] Appl. No.: 198,260

Related U.S. Application Data

[63] Continuation-in-part of Ser. No. 50,057, June 26, 1970, abandoned.

[52] U.S. Cl. ................179/100.2 ZA, 179/100.2 T, 242/55.19 A, 274/4 E

[51] Int. Cl. ....................... G11b 23/08, G11b 15/66

[58] Field of Search ............... 179/100.2 Z, 100.2 T, 179/100.2 MI; 226/49, 90, 91, 190; 242/55, 19 A; 274/4 D, 4 E

[56] References Cited

UNITED STATES PATENTS

| | | | |
|---|---|---|---|
| 3,394,898 | 7/1968 | Laa | 179/100.2 Z |
| 3,601,557 | 8/1971 | Lennox | 179/100.2 Z |
| 3,638,953 | 2/1972 | Kodama | 179/100.2 Z |
| 3,658,193 | 4/1972 | Gross | 179/100.2 Z |
| 3,531,127 | 9/1970 | Harper | 179/100.2 Z |
| 3,647,984 | 3/1972 | Watanabe | 179/100.2 Z |
| 3,643,038 | 2/1972 | Sato | 179/100.2 T |
| 3,674,942 | 7/1972 | Sugaya | 179/100.2 Z |

*Primary Examiner*—Terrell W. Fears
*Assistant Examiner*—Alfred H. Eddleman
*Attorney*—Townsend and Townsend

[57] ABSTRACT

A system for interlocking a number of components of a tape transport system when the system is in an operative mode, such as a record, playback, rewind or fast-forward mode. The system is of the type which utilizes a rotary head assembly, a carriage mechanism for advancing a tape cartridge into an operative location aligned with the head assembly, rotatable spindle structure on which the tape reels of the cartridge are moved as the latter is advanced into its operative locations, and a shiftable arm mechanism having tape guides thereon for pulling a stretch of the tape out of the cartridge and partially about the rotary head assembly. A number of interlocks on the system assures that certain functions of the components are prohibited as other functions of the components are being performed or as the arm mechanism shifts with respect to the rotary head assembly.

15 Claims, 8 Drawing Figures

INTERLOCK SYSTEM FOR TAPE TRANSPORT

This is a continuation-in-part of application Ser. No. 50,057, filed June 26, 1970, entitled "INTERLOCK SYSTEM FOR TAPE TRANSPORT," now abandoned, such application being incorporated herein by reference.

This invention relates to improvements in tape transports and, more particularly, to an interlock system for a tape transport having a rotary head assembly and adapted for use with a tape cartridge.

In utilizing a tape cartridge with a video tape transport having a rotary head assembly, it is necessary to present the tape to the head assembly in some manner to permit the tape to be scanned by the rotating heads of the assembly as the tape moves from one reel of the cartridge to the other reel. One way of accomplishing this is to use a shiftable arm mechanism having tape-engaging guides for pulling the tape out of the cartridge through an open extremity thereof and about a portion of the head assembly. The cartridge is formed in a manner such that the tape guides enter the cartridge near the backside of a tape stretch adjacent to the open extremity. This necessitates that the cartridge be in an operative position relative to the head assembly before the tape guides pull the tape out of the cartridge. Also, provision is usually made in a tape transport of this type for the recording of video signals on the tape, playback of video signals recorded on the tape, rewinding of the tape after recording or playback, and moving the tape rapidly forwardly in a fast-forward mode generally during playback.

Since the tape transport can perform a number of different functions, it must be protected against damage to its components or to the tape associated with it such as might occur if, for instance, an attempt were made to remove the cartridge from its operative location when the tape was in any of the aforementioned modes. A need, therefore, has arisen for apparatus associated with such a tape transport to protect the same and the tape used with it while the transport operates in any one of its different modes.

The present invention provides such protection by utilizing interlock means which prevents one function, such as the removal of the cartridge from an operative location near a rotary head assembly, from being performed while another function, such as a record, playback, rewind, or fast-forward operation is being performed. The apparatus of this invention requires that it always be returned to a stop mode in passing between its other modes. This feature prevents the simultaneous occurrence of functions which are not capable of being performed concurrently. The end result is protection for the tape and the tape transport and a longer operating life for both.

The primary object of this invention is to provide an interlock system for a tape transport capable of performing a number of functions wherein the system locks out all other functions of the tape transport when the latter is performing a particular function to thereby prevent damage to the transport itself or to the tape used with it.

Another object of this invention is to provide a system of the type described which minimizes human error in the handling of a tape transport and which renders a tape transport especially adapted for use by persons having little or no skills in operating tape transports.

Other objects of this invention will become apparent as the following specification progresses, reference being had to the accompanying drawing for an illustration of an embodiment of the invention.

Figure 1:
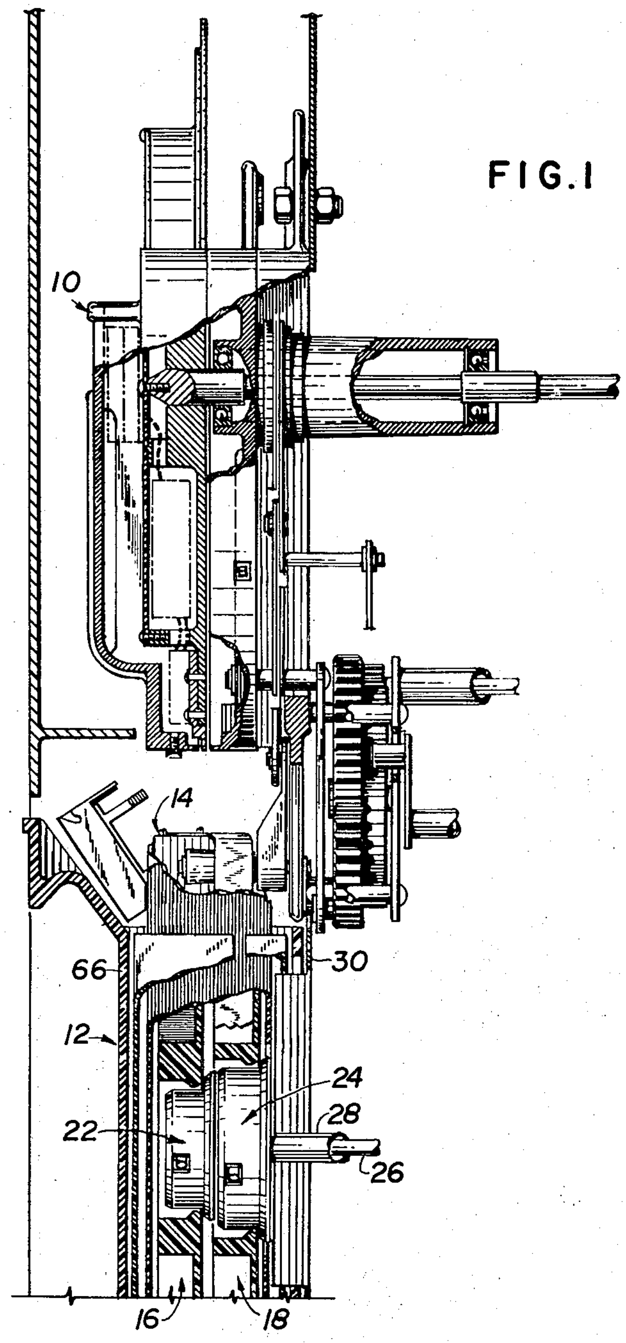
FIG. 1 is a vertical section through a tape transport system having a rotary head assembly, a tape cartridge, a carriage mechanism for moving the tape cartridge onto spindle structure below the rotary head assembly, and a shiftable arm mechanism having tape guides for pulling a stretch of magnetic tape out of the cartridge and partially about said rotary head assembly.
Figure 2:
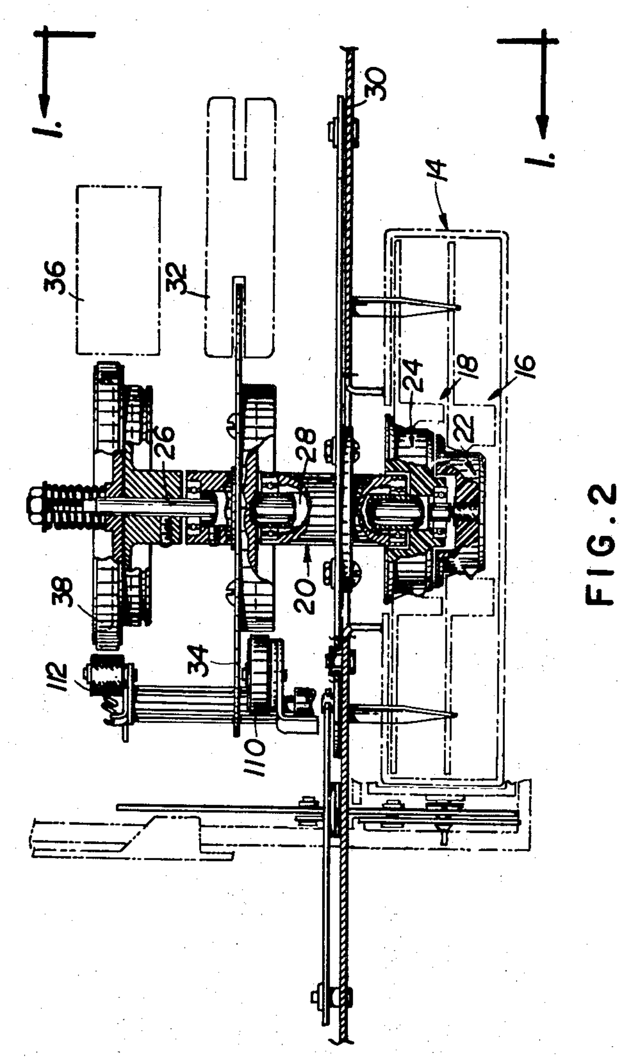
FIG. 2 is a top plan view of the spindle structure with the cartridge being shown in phantom thereon.
Figure 7:
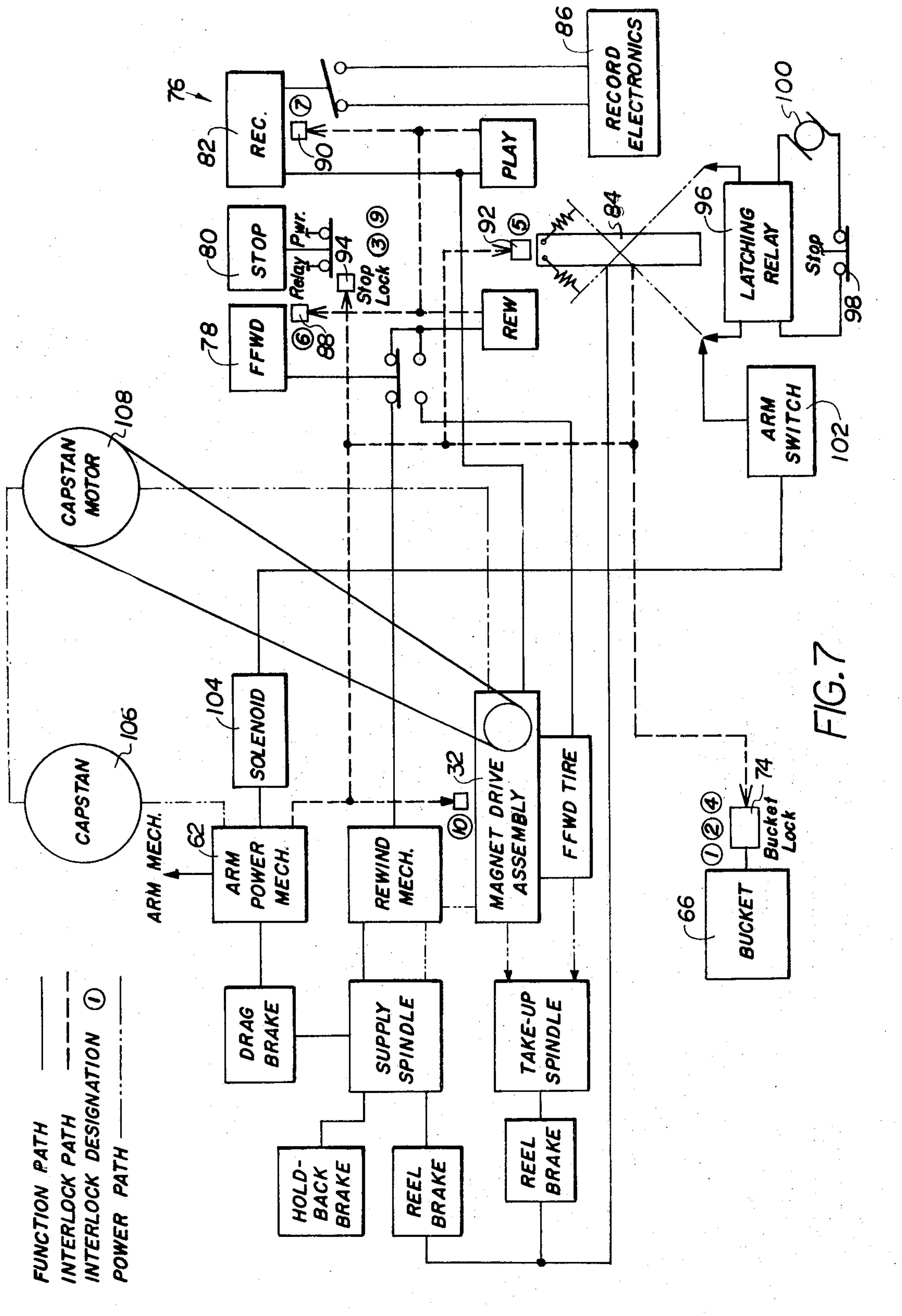
FIG. 7 is a block diagram of one form of the interlock system of this invention.

One form of the interlock system of this invention is shown in the block diagram of FIG. 7 and is adapted for use with a video tape transport having a rotary head assembly 10, a carriage mechanism 12 for moving a cartridge 14 into an operative position vertically aligned with and below head assembly 10 (FIG. 1). The cartridge is of the reel-over-reel type and has a pair of reels 16 and 18 therein for releasable attachment to respective spindles of spindle structure 20 when the cartridge is in its operative position (FIG. 1). The spindles have rotors 22 and 24 (FIG. 2) attached to respective shafts 26 and 28, shaft 26 being within and concentric with shaft 28 and rotor 22 being axially spaced from rotor 24 and being of a smaller diameter than rotor 24 to accommodate its smaller reel. Spindle structure 20 is carried on a base plate 30 as is rotary head assembly 10. 28 and rotor 22 being axially spaced from rotor 24 and being of a smaller diameter than rotor 24 to accommodate its smaller reel. Spindle structure 20 is carried on a base plate 30 as is rotary head assembly 10.

An eddy current motor 32 (FIG. 2) is coupled by disc 34 to shaft 28 to rotate the latter and thereby reel 18 which is a tape take-up reel. A motor 36 is coupled by a clutch assembly 38 to shaft 28 for rotating it and thereby reel 16, the tape supply reel.

The rotary head assembly has a disc 40 (FIG. 4) having a number of circumferentially spaced heads 42 thereon for scanning a stretch 44 of a magnetic tape 46 after the latter has been pulled out of the cartridge and partially disposed along the arcuate path of travel of the heads (FIG. 4) when the cartridge is in its operative position.

Figure 3:
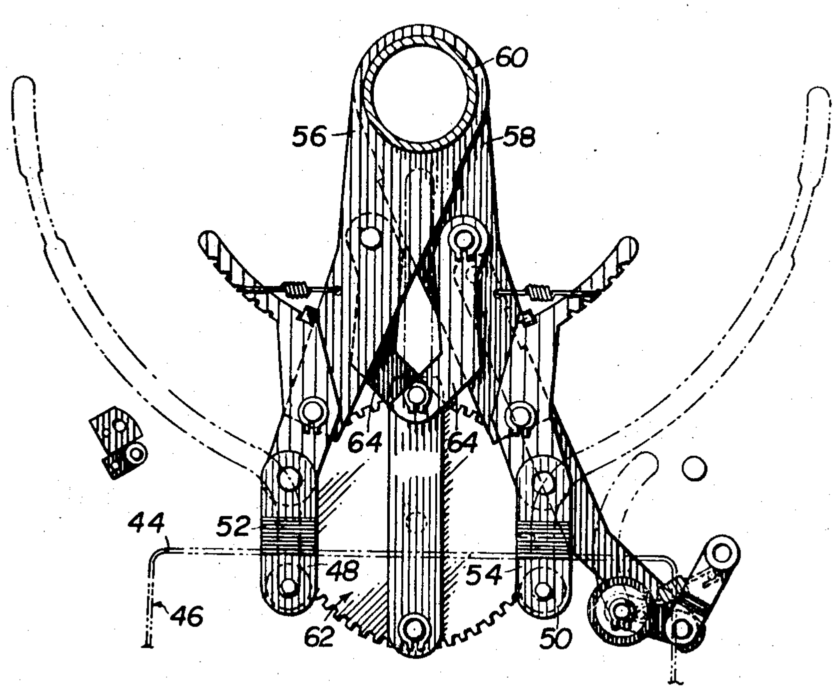
FIG. 3 is a front elevational view of the shiftable arm mechanism.
Figure 4:
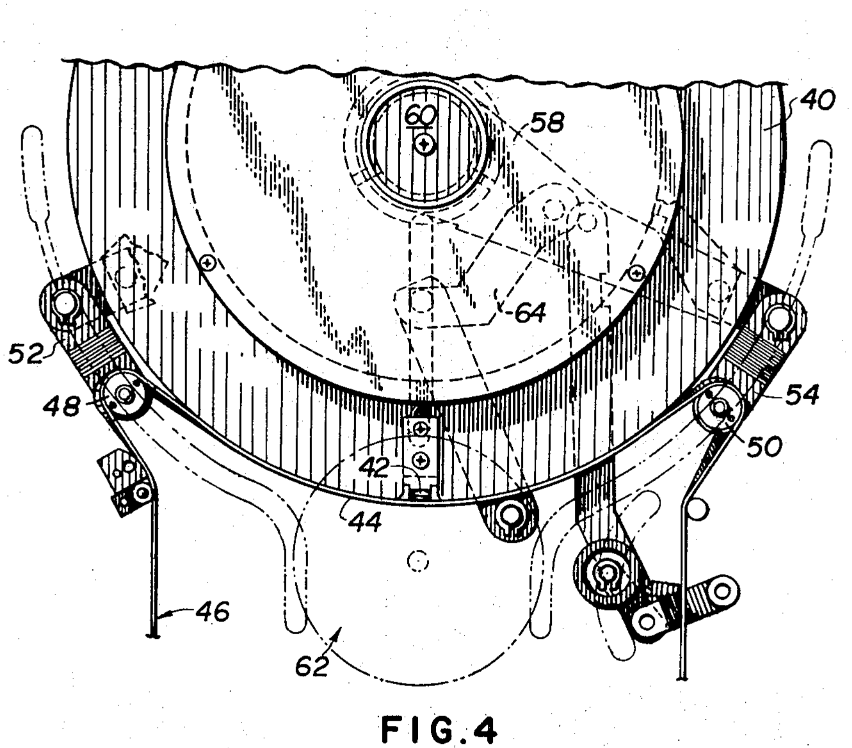
FIG. 4 is a view similar to FIG. 3 but showing the arm mechanism in an operative position with respect to said rotary head assembly.
Figures 5, 6:
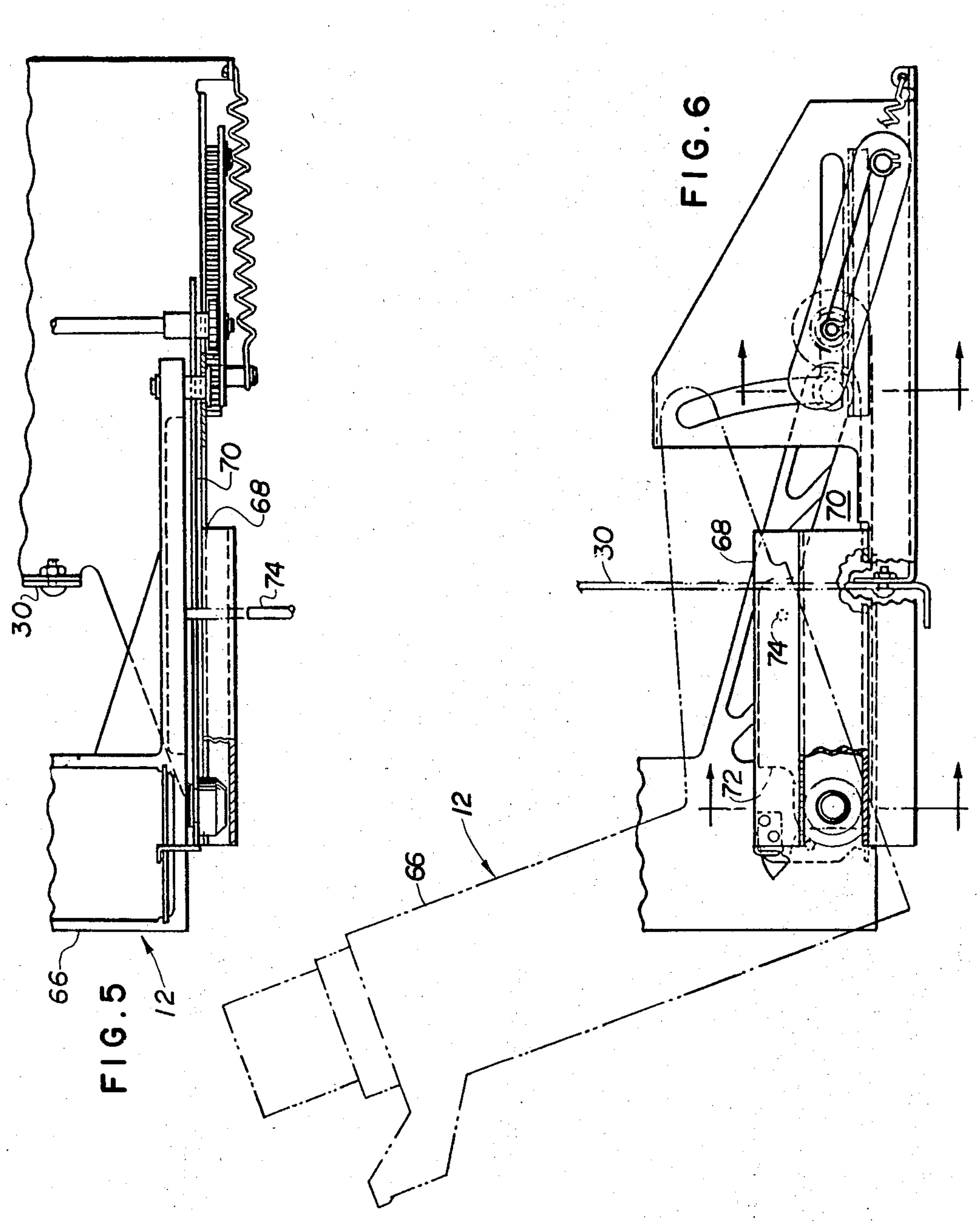
FIG. 5 is an enlarged, fragmentary, top plan view of the carriage mechanism for moving the cartridge into an operative position below the rotary head assembly.
FIG. 6 is a side elevational view of the mechanism of FIG. 5.

A shiftable arm mechanism (FIGS. 3 and 4) functions to effect movement of such tape stretch out of the cartridge. To this end, a pair of tape guides 48 and 50 are secured to the lower ends of respective drag links 52 and 54 and are receivable in respective recesses in cartridge 14 behind tape stretch 44 (FIGS. 1 and 3). The drag links are carried by radius arms 56 and 58, respectively, mounted on an arbor 60 extending laterally from the base plate, links 52 and 54 and arms 56 and 58 defining parts of the shiftable arm mechanism. A crank-wheel drive 62 is coupled by toggle links 64 to the radius arms to move the latter about arbor 60 to elevate guides 48 and 50 when the latter are in the cartridge (FIG. 3) to pull stretch 44 out of the cartridge and about a portion of the path of heads 42 (FIG. 4).

Carriage mechanism 12 includes a bucket 66 which is mounted on a pair of side plates 68 for movement toward and away from the base plate. The side plates are secured to the base plate and extend laterally therefrom. The bucket has a pair of tie bars 70 at the sides thereof, one of the tie bars having a rear edge 72 which is blocked by an interlock pin 74 when the bucket is in an operative location adjacent to the base plate. This pin is longitudinally movable behind edge 72 when a control means 76 (FIG. 7) is actuated to cause the tape transport to go into a record, playback, rewind or fast-forward mode. In the alternative, pin 74 could be pivotally mounted on adjacent structure for swinging movement into and out of its blocking location.

Control 76 includes a number of actuators, such as push buttons 78, 80 and 82 corresponding to fast forward, stop and record modes of the transport. A knob 84 rotates about an axis from a neutral position into either one of a pair of opposed directions. For purposes of illustration, when the knob is rotated counterclockwise, the transport goes into a rewind mode if button 78 is not depressed. Otherwise, the transport is placed in a fast-forward mode. Similarly, rotation of knob 84 in a clockwise sense (FIG. 7) places the transport in a playback mode unless button 82 is depressed. If depresed, the button enables the record electronics 86 and places the transport in a record mode.

Control 76 also includes a number of interlocks, including interlocks 88, 90, 92 and 94, hereinafter described. These interlocks may be mechanical in nature or may be formed from electromechanical devices.

Interlock 88 locks out fast forward and rewind modes when the transport is in a record or playback mode. Interlock 90 locks out record and playback when the transport is in a fast forward or rewind mode. Another interlock 92 prevents movement of knob 84 as the radius arms lower tape guides 48 and 50. Another interlock 94 coupled with stop button 80 prevents this button from being depressed as the tape guides are raised by the radius arms.

A latching relay 96 holds the knob 84 in a rotated position until switch 98 coupled with stop button 80 is open to interrupt power from source 100 to the relay and arm switch 102 provides another interlock which prevents the actuation of drive 62 by a solenoid 104 until control knob 84 is latched by relay 96. A capstan 106 has a motor 108 coupled with drive 62 and with eddy current motor 32 for supplying rotational power thereto.

The interlock philosophy of this invention is as follows:

1. Bucket cannot be operated when transport is functioning.
2. Transport cannot operate when bucket is retracted.
3. Transport cannot be stopped until tape guides are up.
4. Bucket cannot be opened during guides-down cycle.
5. Control knob cannot be moved from stop position during guides-down cycle.
6. Fast forward mode cannot be realized when going into play/record.
7. Record cannot operate when going into Rewind/Fast forward.
8. Gudes cannot be raised (begin travel up cycle) until control knob is latched.
9. No binding or malfunction to occur when stop button is depressed or held down during guides up/-down cycles.
10. Eddy current motor must provode take up during guides up/down cycles.

Detent structure is used to limit the rotation of crank wheel 62 to a half revolution each time the tape guides are elevated. Similarly, the detent structure limits the crank wheel rotation to a half revolution as the guides move downwardly.

Figure 8:
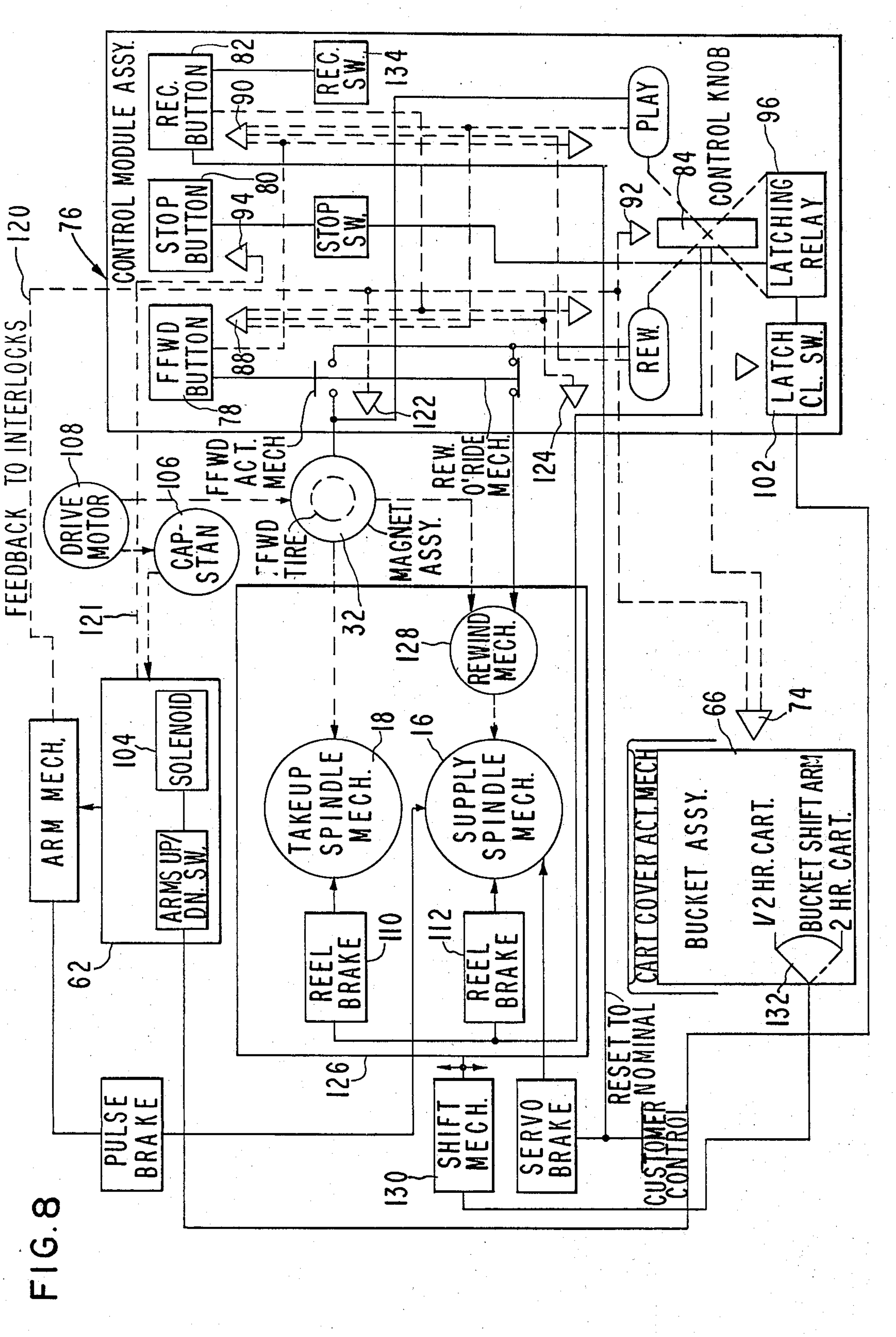
FIG. 8 is a block diagram of a second form of the interlock system.

For a record mode, the following steps are performed by the various components:

1. Activate Record Button
2. Record electronics switched on depressed,
3. Lock record button in
4. Lock bucket closed
5. Lock fast forward out
6. Engage eddy current motor
7. Guides Release reel brakes
8. Relay latches
9. Close arm switch
   a. Activate solenoid
   b. Engage gear drive
   c. Drive out detent follower to actuate interlocks
   d. Guides travel up
   e. Detent follower engages after half revolution The reverse operation following a record mode is as follows:

1. Actuate stop button
2. Relay releases
3. Close arm switch
4. Record electronics switched off
5. Eddy current motor held in play until guides are down
6. Engage brakes
7. Bucket lock retracts For a playback mode, the following steps are performed:

1. Lock bucket closed
2. Lock fast forward out
3. Lock record out
4. Engage eddy current motor
5. Disengage reel brake
6. Engage relay latch
7. Close arm switch
   a. Actuate solenoid
   b. Engage gear drive
   c. Drive out detent follower and activate interlocks
   d. Guide travel up
   e. Detent follower engages after one half revolution Similarly, to return the system to a stop mode from playback, the following steps are performed:

1. Actuate stop button
2. Relay releases
3. Close arm switch
   a. Actuate solenoid
   b. Engage gear drive
   c. Drive out detent follower and activate interlocks
   d. Gudies travel down e. Detent follower engages after one half revolution
4. Eddy current motor held in play until guides are down
5. Engage reel brakes
6. Bucket lock retracts To cause the system to go into a rewind mode, the following steps are performed:
1. Lock bucket closed
2. Lock fast forward out
3. Lock record out
4. Eddy current motor not actuated
5. Disengage reel brakes
6. Actuate rewind mechanism
7. Latch relay Similarly, to return the system to a stop condition from a rewind mode, the following steps are performed:
1. Actuate stop button
2. Unlatch relay
3. Retract rewind mechanism
4. Engage reel brakes
5. Bucket lock retracts To place the system in a fast forward mode, the following steps are performed:
1. Actuate fast forward button
2. Disengage rewind actuating mechanism
3. Lock bucket closed
4. Lock record out
5. Disengage reel brakes
6. Engage fast forward tire on magnet drive on eddy disc rim
7. Latch relay Similarly, to return from the fast forward mode to the stop mode, the following steps are performed:
1. Actuate stop button
2. Unlatch relay
3. Disengage magnet fast forward drive
4. Engage brakes
5. Remove rewind actuator blocking mechanism
6. Bucket lock retracts FIG. 8 illustrates a slightly different embodiment of control means 76 although corresponding elements will be found in both FIGS. 7 and 8, the essential differences being a feedback linkage in FIG. 8 and denoted by the numeral 120. Such feedback linkage, shown by a dashed line, couples the shiftable arm mechanism to several interlocks 122 and 124, hereinafter described. This feedback linkage can be of any construction, such as a rigid lever shiftably mounted in any suitable manner. FIG. 8 also shows a spindle shift plate asembly 126 on which is mounted spindles 16 and 18, a pair of reel brakes 110 and 112 coupled to respective spindles, and a rewind mechanism 128. A shift mechanism 130 coupled with assembly 126 is responsive to a tape cartridge placed in bucket 66. For instance, a relatively large cartridge, i.e., one having tape equivalent in length to two hours playing time will cause arm 132 to be shifted in one direction to, in turn, actuate shift mechanism 130 so that the spindles 16 and 18 will shift downwardly into locations aligned with the reels of the cartridge so as to be disposed to receive the reels as the bucket moves the cartridge into an operative position with respect to the rotary head assembly. For a relatively small cartridge, i.e., one having tape equivalent in length to one-half hour playing time, arm 132 will remain stationary so that shift mechanism 130 will not be actuated and spindles 16 and 18 will remain in their initial positions, properly aligned to receive respective reels of the smaller cartridge in bucket 66.

Feedback linkage 120 is also coupled, as shown by a dashed line, with bucket interlock pin 74 to prevent the latter from being retracted whenever radius arms 56 and 58 are not in their down positions. The feedback linkage also actuates interlock 122 which serves to prevent eddy current motor 32 from being returned to its off position, thereby assuring take-up of the tape as the arms move to their down positions.

Interlock 124 serves to prevent reel brakes 110 and 112 from being applied until the radius arms are near their down positions. Feedback linkage 120 is also coupled with interlock 92 as shown by a dashed line so as to cause the latter to prevent control knob 84 from being turned to the rewind position when the radius arms are not in their down positions.

The control knob can be provided with a cam having a mechanical over-ride capability so that the control knob can be returned manually to the stop position without depressing stop button 80. This feature will avoid damage to the control knob and the structure coupled with it by unskilled users of the tape transport who fail to stop the operation of the tape transport by depressing stop button 80.

When bucket 66 is open, control knob 84 cannot be latched since power is interrupted to latching relay 96 and solenoid 104, thereby preventing upward movement of the radius arms without a cartridge in bucket 66. Latch switch 102 is actuated by the clapper of relay 96 and switch 102 is coupled to solenoid 104 so that crank-wheel drive 62 can only be triggered when control knob 84 is rotated to the play mode and is latched. Thus, the radius arms can only move the tape guides when the latching relay is energized.

Bucket interlock pin 74 prevents bucket 66 from being opened in any mode except the stop mode. The bucket will be open when it is spaced from the location at which it places a cartridge in an operative position with respect to the rotary head assembly. Interlock pin 74 is actuated by the rotation of the control knob and by feedback linkage 120, the latter being operable to detect a condition where the radius arms are not in the down position. If, for any reason, bucket 66 is open and if the tape transport is in an operating mode, the bucket cannot be closed fully until interlock pin 74 has been retracted.

The second feedback linkage 121 operates interlock 94 which defines a blocking link movable into the path of movement of stop button 80 during movement of the arm mechanism. Thus, the stop button can be depressed when the radius arms are in their up or down positions but not when the radius arms are moving between the up and down positions.

Interlock 88 prevents fast-forward button 78 from being depressed when control knob 84 is in the play mode. Thus, button 78 can only be depressed when the control knob is in the stop position. Conversely, if putton 78 is depressed, the control knob cannot be turned to the play position.

The record button 82 can be depressed only in the stop position. The tape transport will go into the record mode when the control knob is turned to the play position. If record button 82 is depressed, control knob 84 cannot be turned to the rewind position.

The record function may be satisfied mechanically but impaired electrically if a pre-recorded cartridge is inserted into bucket 66. The cartridge is provided with a lock-out tab which is removed when recording on the tape is not to be erased. The probe for sensing the tab is connected to a switch which interrupts the record switch 134.

I claim:

1. In a tape transport of the type having a base plate, a rotary head assembly mounted on the base plate, a support for moving a tape cartridge into an operative position adjacent to the base plate and aligned with the rotary head assembly, a shiftable arm mechanism having tape guide means thereon for moving a stretch of magnetic tape out of the cartridge and partially about the rotary head assembly when the cartridge is in its operative position, spindle structure rotatably mounted on the base plate and adapted to be coupled with the reels of the tape cartridge when the latter is in its operative position, and means coupled with the spindle structure for rotating the same relative to the base plate, the combination with the support and the arm mechanism of: control means adapted to be coupled with the base plate and having a shiftable control member movable from an initial location into either of a pair of operating locations corresponding to respective operative modes of the tape transport for causing sequential actuation of the rotating means and the arm mechanism when the control member is in one of said operating locations and for actuating the rotating means when the control member is in the other operating location; and means adapted to be shiftably mounted on the base plate and responsive to the movement of the control member for locking the support against movement when the support places a tape cartridge in its operative position and when said control member is in either of said operating locations.

2. In a tape transport as set forth in claim 1, wherein the control means includes a number of actuators capable of being activated, and means locking certain of the actuators against activation when one of the actuators is activated.

3. In a tape transport as set forth in claim 1, wherein said control means includes a latching relay capable of being actuated to releasably hold the control member in either of said operating locations, said control means including stop structure for deactuating the relay to return the control member to its initial location.

4. In a tape transport as set forth in claim 1, wherein said control means has a number of shiftable actuators corresponding to the record, playback, fast-forward and rewind modes of said tape transport, and interlock means coupled with said actuators for locking certain of the actuators against movement when one of the actuators has been moved to cause the tape transport to be in a predetermined operative mode.

5. In a tape transport as set forth in claim 1, wherein is included a feedback linkage coupled with the arm mechanism and responsive to the operative location of the same with respect to said rotary head assembly, said locking means being coupled with said feedback linkage and being actuated in response to the movement thereof.

6. In a tape transport as set forth in claim 1, wherein the arm mechanism moves from a first location with the tape guides thereof adjacent to said tape stretch when the latter is in the tape cartridge to a second location with said tape guides adjacent to said rotary head asembly, said locking means being actuated when the arm mechanism is out of said first position.

7. In a tape transport as set forth in claim 6, wherein is included a feedback linkage coupled with said arm mechanism and movable in response to the movement of the arm mechanism away from said first location, said feedback linkage being coupled to said locking means for actuating the latter as a function of the movement of said feedback linkage.

8. In a tape transport as set forth in claim 6, wherein said rotating means is capable of being releasably maintained in driving relationship to said spindle structure, an actuatable interlock device for releasably maintaining said rotating means in said driving relationship, and a feedback linkage responsive to the movement of the arm mechanism out of said first location for actuating said interlock device.

9. In a tape transport as set forth in claim 6, wherein is included a reel brake coupled with the spindle structure and capable of being releasably actuated to cause said spindle structure to be in a stopped condition, an actuatable interlock device for releasably actuating the reel brake, and a feedback linkage responsive to the movement of the arm mechanism out of the first location for actuating the interlock device.

10. In a tape transport of the type having a base plate, a rotary head assembly mounted on the base plate, a support for moving a tape cartridge into an operative position adjacent to the base plate and aligned with the rotary head assembly, a shiftable arm mechanism having tape guide means thereon for moving a stretch of magnetic tape out of the cartridge and partially about the rotary head assembly when the cartridge is in its operative position, spindle structure rotatably mounted on the base plate and adapted to be coupled with the reels of the tape cartridge when the latter is in its operative positions, and means coupled with the spindle structure for rotating the same relative to the base plate, the combination with the base plate, the arm mechanism and the support of: control means coupled with the base plate and having a shiftable control member movable from an initial position into either of a pair of operating locations corresponding to respective operative modes of the tape transport for causing sequential operation of said rotating means and said arm mechanism when the control member is in one of said operating locations and for actuating the rotating means when the control member is in the other operating location; an actuatable interlock device for holding the support against movement when the tape cartridge carried thereby is in an operative position; and means responsive to the position of the arm mechanism for actuating the interlock device.

11. In a tape transport as set forth in claim 10, wherein said actuating means includes a feedback linkage coupled with the interlock device and shiftably mounted on the base plate for movement in response to the movement of the arm mechanism in a direction corresponding to the removal of the tape stretch from the tape cartridge.

12. In a tape transport as set forth in claim 10, wherein is included a second interlock device coupled with the rotating means for holding the same in driving relationship to the spindle structure, said actuating means including a feedback linkage coupled to the first-mentioned and second interlock devices for simultaneously actuating the same in response to the movement of the arm mechanism in a direction corresponding to the removal of the tape stretch out of the tape cartridge.

13. In a tape cartridge as set forth in claim 12, wherein is provided a reel brake coupled to the spindle structure and capable of being releasably maintained in braking relationship thereto, and including a third actuatable interlock device for releasably maintaining the reel brake in said braking relationship, said feedback linkage being coupled to the third device for actuating the latter simultaneously with the actuation of the first-mentioned and second interlock devices.

14. In a tape transport as set forth in claim 12, wherein said control member is movable in one direction into a play position and movable in the opposite direction into a rewind position, and including a fourth interlock device actuatable to releasably prevent the control member from moving into the rewind position when said arm mechanism has moved in a direction corresponding to the removal of the tape stretch from said cartridge, the feedback linkage coupled with the fourth device for actuating the latter simultaneously with the first, second and third interlock devices.

15. In a tape transport as set forth in claim 10, wherein the interlock device is coupled with the control member and being actuated in response to the movement thereof into either of said operating locations.

* * * * *